United States Patent
Xu

(10) Patent No.: US 11,187,610 B2
(45) Date of Patent: Nov. 30, 2021

(54) LIQUID LEAK DETECTION DEVICE AND OVEN

(71) Applicant: SHIMADZU CORPORATION, Kyoto (JP)

(72) Inventor: Bo Xu, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 3 days.

(21) Appl. No.: 16/969,167

(22) PCT Filed: Oct. 23, 2018

(86) PCT No.: PCT/JP2018/039315
§ 371 (c)(1),
(2) Date: Aug. 11, 2020

(87) PCT Pub. No.: WO2019/176154
PCT Pub. Date: Sep. 19, 2019

(65) Prior Publication Data
US 2021/0041320 A1    Feb. 11, 2021

(30) Foreign Application Priority Data

Mar. 14, 2018  (CN) .......................... 201810207869.1

(51) Int. Cl.
*G01M 3/04* (2006.01)
*G01N 30/06* (2006.01)

(52) U.S. Cl.
CPC .............. *G01M 3/04* (2013.01); *G01N 30/06* (2013.01); *G01N 2030/067* (2013.01)

(58) Field of Classification Search
CPC .......... G01M 3/04; G01M 3/18; G01M 3/186; G01M 3/002; G01M 3/08; G01M 3/14;
(Continued)

(56) References Cited

FOREIGN PATENT DOCUMENTS

| CN | 204649701 U | 9/2015 |
|---|---|---|
| JP | 3127573 U | 12/2006 |

(Continued)

OTHER PUBLICATIONS

International Search Report with respect to International Patent Application No. PCT/JP2018/039315, dated Jan. 22, 2019.
(Continued)

*Primary Examiner* — John Fitzgerald
*Assistant Examiner* — Truong D Phan
(74) *Attorney, Agent, or Firm* — Renner, Otto, Boisselle & Sklar, LLP

(57) ABSTRACT

A liquid leak detection device is used in an oven. The oven has an oven casing having a sealed inner space provided with a sample flow path through which a liquid sample flows and a heater provided in the inner space that heats the inner space. The liquid leak detection device includes a gas sensor that is provided in the inner space and detects a liquid sample that has leaked from the sample flow path to the inner space and has been evaporated. The liquid leak detection device further includes a liquid leak pipe path that communicates with the inner space and leads a non-vaporized liquid sample that has leaked from the sample flow path to the inner space out of the oven casing, and a liquid sensor that is provided outside of the oven casing and detects a liquid sample led out by the liquid leak pipe path.

4 Claims, 1 Drawing Sheet

(58) Field of Classification Search
CPC ...... G01M 3/081; G01M 3/083; G01M 3/141; G01M 3/142; G01M 3/181; G01M 3/182; G01M 3/22; G01M 3/221; G01M 3/222; G01M 3/28; G01M 3/2807; G01M 3/3236; G01M 3/3245; G01M 3/3272; G01M 3/10; G01M 3/143; G01M 3/226; G01N 2030/067; G01N 2030/3084; G01N 30/06; G01N 30/30; G01N 35/00; G01N 2223/647

See application file for complete search history.

(56) References Cited

FOREIGN PATENT DOCUMENTS

| | | | |
|---|---|---|---|
| JP | 2014-102096 A | | 6/2014 |
| JP | 2014102096 A | * | 6/2014 |
| JP | 2015-014533 A | | 1/2015 |
| JP | 2015014533 A | * | 1/2015 |
| JP | 2018-004623 A | | 1/2018 |

OTHER PUBLICATIONS

Written Opinion of the International Searching Authority with respect to International Patent Application No. PCT/JP2018/039315 (English Machine Translation), dated Jan. 22, 2019.
Office Action issued in corresponding Chinese Patent Application No. 201810207869.1 dated Aug. 19, 2020, with English language translation.

* cited by examiner

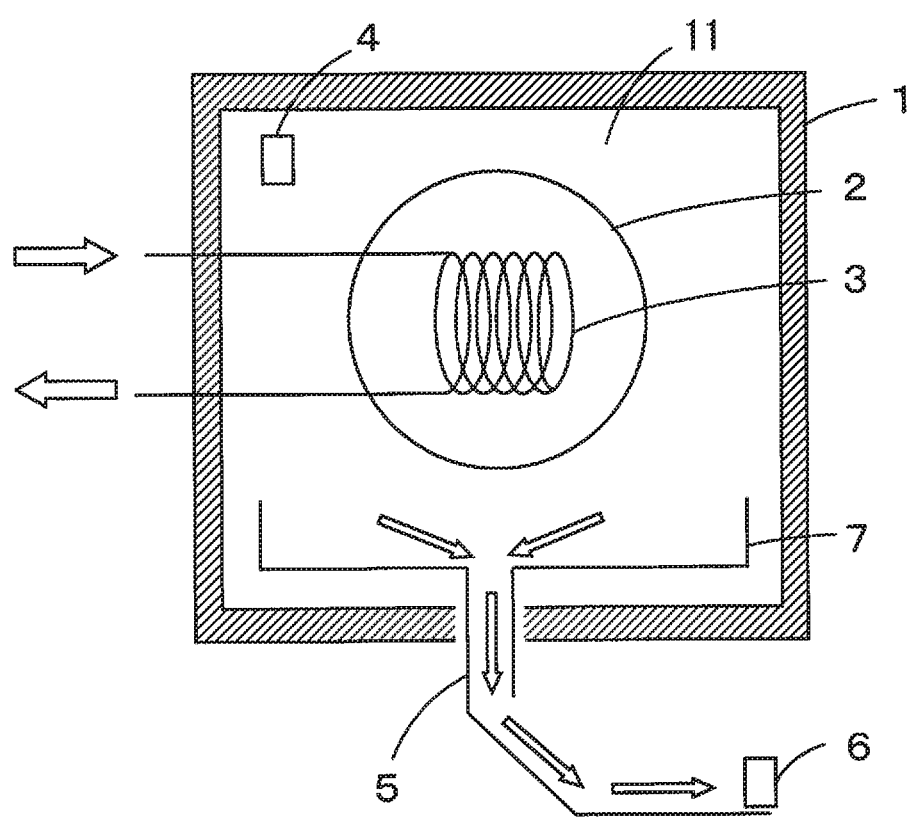

LIQUID LEAK DETECTION DEVICE AND OVEN

TECHNICAL FIELD

The present invention relates to a liquid leak detection device and an oven.

BACKGROUND ART

An oven is a device universally used in a liquid chromatographic system (or other chromatographic systems such as supercritical fluid chromatography and ion chromatography). A reaction tank used in the liquid chromatographic system is one type of an oven, for example. In general, a flow path through which a sample flows (hereinafter referred to as a sample flow path) is stored in the oven, and the sample in the flow path is heated to a predetermined temperature by a heater provided in the oven during an operation of the oven. However, in a case where leakage occurs at the sample flow path, a security risk may occur.

SUMMARY OF INVENTION

Technical Problem

It is considered that a liquid sensor is used to detect leakage at the sample flow path in the oven. However, the operating temperature of the liquid sensor is limited (the temperature is generally required to be 100° C. or lower), and the liquid sensor cannot work normally in the oven in a high temperature state. Thus, liquid having a high temperature cannot be detected (the liquid in a high temperature state has about 150° C.) Therefore, in the prior arts, only a single gas sensor is usually provided in an oven having a high operating temperature. In a case where leakage occurs at the sample flow path, the leaked sample is vaporized in the oven and detected by the gas sensor.

However, the inventor of the present application has discovered that, in a case where the oven works at a low temperature, or the boiling point of a leaked sample is high, that is, in a case where the leaked sample is not vaporized, there is a problem that leakage at the sample flow path is not detected by the gas sensor, so that a security risk occurs. That is, the prior arts have a problem that leakage at the sample flow path in the oven cannot be detected reliably.

The present invention has been conceived considering the above-mentioned problems, and an object of the present invention is to provide a liquid leak detection device that enables reliable detection of leakage at a sample flow path in an oven.

Solution to Problem

A liquid leak detection device of the present invention is used in an oven. The oven has an oven casing having a sealed inner space provided with a sample flow path through which a liquid sample flows and a heater provided in the inner space and heats the inner space. The liquid leak detection device includes a gas sensor that is provided in the inner space of the oven casing and detects a liquid sample that has leaked from the sample flow path to the inner space and has been vaporized. The liquid leak detection device further includes a liquid leak pipe path that communicates with the inner space and leads a non-vaporized liquid sample that has leaked from the sample flow path to the inner space out of the oven casing, and a liquid sensor that is provided outside of the oven casing and detects the liquid sample that is led out by the liquid leak pipe path.

In the liquid leak detection device of the present invention, the liquid leak pipe path may be made of a thermal conductive material. Thus, when flowing through the liquid leak pipe path, the liquid sample is gradually cooled by the heat dissipation effect of the thermal conductive material that constitutes the liquid leak pipe path. Thus, the temperature of the liquid sample can be lowered to a temperature in the operating range of the liquid sensor. Thus, the liquid sample can be detected by the liquid sensor.

The liquid leak detection device of the present invention may further include a liquid leak collector that is provided in a bottom portion of the inner space and collects a non-vaporized liquid sample. In this case, it is preferable that the liquid leak pipe path communicates with the liquid leak collector and leads out the non-vaporized liquid sample collected by the liquid leak collector. Thus, the liquid that has leaked in the oven is led out, and the liquid leakage in the oven can be detected reliably.

An oven of the present invention includes an oven casing that has a sealed inner space provided with a sample flow path through which a liquid sample flows, a heater that is provided in the inner space and heats the inner space, and the liquid leak detection device of the present invention.

Advantageous Effects of Invention

The present invention enables detection of a leaked liquid by the liquid sensor provided outside of the oven casing even in a case where a leaked sample is not vaporized. Further, because the liquid sensor is arranged outside of the oven, the problem with the liquid sensor not being able to work normally at a high temperature has been solved. Thus, leakage at the sample flow path in the oven can be detected reliably.

BRIEF DESCRIPTION OF THE DRAWINGS

FIG. 1 A schematic diagram showing one inventive example of a liquid leak detection device and an oven.

DESCRIPTION OF EMBODIMENTS

A liquid leak detection device and an oven of the present invention will be described below with reference to the drawings.

As shown in FIG. 1, the oven mainly includes an oven casing 1 and a heater 2. The oven casing 1 has a sealed inner space 11, and a sample flow path 3 is provided in the inner space 11. A liquid sample flows through the sample flow path 3. The heater 2 is installed in the inner space 11 and heats the inner space 11. In this inventive example, the oven casing 1 has a two-layer structure in which a thermal insulator is provided, and has a function of keeping the inner space 11 warm. The arrows in FIG. 1 respectively indicate inflow and outflow directions of the liquid sample.

The liquid leak detection device includes a gas sensor 4, a liquid leak pipe path 5 and a liquid sensor 6.

The gas sensor 4 is installed in the inner space 11 of the oven casing 1. When a liquid leak has occurred at the sample flow path 3, in a case where the boiling point of a leaked sample is lower than the temperature in the inner space 11 of the oven casing 1, the leaked sample is vaporized. Therefore, the gas sensor 4 can detect the liquid leak in the oven by detecting the liquid sample that has leaked from the sample flow path 3 to the inner space 11 and have been vaporized.

The liquid leak pipe path 5 communicates with the inner space 11 of the oven casing 1. Therefore, when a liquid leak has occurred at the sample flow path 3, a non-vaporized liquid sample that has leaked from the sample flow path 3 to the inner space 11 is led out of the oven casing 1 by the liquid leak pipe path 5.

The liquid sensor 6 for detecting the liquid sample that has been led out of the oven casing 1 by the liquid leak pipe path 5 is installed outside of the oven casing 1. Thus, even in a case where the leaked sample is not vaporized, the leak liquid can be detected by the liquid sensor 6 installed outside of the oven casing 1.

It is possible to measure an organic vapor, water, an organic liquid and a plurality of other liquids at the same time by providing both of the gas sensor 4 and the liquid sensor 6 in the liquid leak detection device, and reliability of detection of leakage at the sample flow path in the oven is improved.

The liquid leak pipe path 5 is made of a thermal conductive material such as metal. Thus, when flowing through the liquid leak pipe path, the liquid sample is gradually cooled due to the heat dissipation effect of the thermal conductive material that constitutes the liquid leak pipe path, and the temperature of the liquid sample is lowered to a temperature in an operating range of the liquid sensor. Thus, the leaked liquid sample can be detected by the liquid sensor. Here, the length of the liquid leak pipe path 5 is not limited in particular as long as the liquid sample can be sufficiently cooled. While the structure in which the liquid leak pipe path 5 is inserted vertically into the oven is shown in FIG. 1, the invention is not limited to this. Part of the liquid leak pipe path 5 may be attached to an outer wall of the oven to be in contact with the outer wall, and another part of the liquid leak pipe path 5 may be inserted into the oven in order to increase the thermal conductivity of the liquid leak pipe path 5. In this manner, the heat of the liquid sample in the liquid leak pipe path 5 can be quickly dissipated due to the thermal conductive effect of the outer wall of the oven.

The installation position for the liquid sensor 6 provided outside of the oven is not limited in particular either as long as the liquid sensor 6 can work appropriately. For example, a tray for receiving the liquid sample can be installed at an outlet port of the liquid leak pipe path 5, and the liquid sensor 6 can be installed in the tray. It is possible to cool the liquid sample more quickly by installing the tray for receiving the liquid sample, and the liquid sample can be detected by the liquid sensor.

The liquid leak detection device further includes a tray-like liquid leak collector 7 that is installed in the bottom part of the inner space 11 and used to collect a non-vaporized liquid sample. The liquid leak pipe path 5 communicates with the liquid leak collector 7 and leads out the liquid sample collected by the liquid leak collector 7. It is possible to lead the liquid sample that has leaked in the oven smoothly out of the oven by providing the tray-like liquid leak collector 7, and the liquid leak in the oven can be detected reliably.

INDUSTRIAL APPLICABILITY

The oven of the present invention may be a reaction tank, for example.

REFERENCE SIGNS LIST

1 Oven Casing
2 Heater
3 Sample Flow Path
4 Gas Sensor
5 liquid leak pipe path
6 Liquid Sensor
7 Liquid leak collector
11 Inner Space

The invention claimed is:

1. A liquid leak detection device used in an oven having an oven casing that has a sealed inner space provided with a sample flow path through which a liquid sample flows and a heater that is provided in the inner space and heats the inner space, comprising:
   a gas sensor that is provided in the inner space and detects a liquid sample that has leaked from the sample flow path to the inner space and has been vaporized,
   a liquid leak pipe path that communicates with the inner space and leads a non-vaporized liquid sample that has leaked from the sample flow path to the inner space out of the oven casing; and
   a liquid sensor that is provided outside of the oven casing and detects the liquid sample that is led out by the liquid leak pipe path,
   wherein
   the liquid leak pipe path is made of a thermal conductive material and lowers a temperature of the non-vaporized liquid sample that is led out of the oven casing to a temperature in an operating range of the liquid sensor by a heat dissipation effect of the thermal conductive material.

2. The liquid leak detection device according to claim 1, further comprising a liquid leak collector that is provided in a bottom portion of the inner space and collects the non-vaporized liquid sample that has leaked from the sample flow path, wherein
   the liquid leak pipe path communicates with the liquid leak collector and leads out the liquid sample collected by the liquid leak collector.

3. An oven comprising:
   an oven casing that has a sealed inner space provided with a sample flow path through which a liquid sample flows;
   a heater that is provided in the inner space and heats the inner space, and
   the liquid leak detection device according to claim 1.

4. A chromatographic system including the liquid leak detection device according to claim 1.

* * * * *